(12) United States Patent
Al-Jundi et al.

(10) Patent No.: US 11,090,580 B2
(45) Date of Patent: Aug. 17, 2021

(54) DEWATERING A HYDROCARBON STORAGE TANK

(71) Applicant: Saudi Arabian Oil Company, Dhahran (SA)

(72) Inventors: Taher L. Al-Jundi, Dhahran (SA); Aziz U. Rehman, Dhahran (SA); Fadhel H. Asfoor, Dhahran (SA); Isa H. Al-Mudaibegh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 43 days.

(21) Appl. No.: 16/536,011

(22) Filed: Aug. 8, 2019

(65) Prior Publication Data

US 2021/0039017 A1 Feb. 11, 2021

(51) Int. Cl.
| | | |
|---|---|---|
| *B01D 17/02* | (2006.01) | |
| *G01N 23/204* | (2006.01) | |
| *G01N 29/44* | (2006.01) | |
| *C10G 33/06* | (2006.01) | |

(52) U.S. Cl.
CPC ....... *B01D 17/0214* (2013.01); *G01N 23/204* (2013.01); *G01N 29/4427* (2013.01); *C10G 33/06* (2013.01); *G01N 2223/639* (2013.01); *G01N 2291/02836* (2013.01); *G01N 2291/048* (2013.01); *G01N 2291/102* (2013.01)

(58) Field of Classification Search
None
See application file for complete search history.

(56) References Cited

U.S. PATENT DOCUMENTS

| | | |
|---|---|---|
| 3,346,508 A | 10/1967 | Thompson |
| 4,597,874 A | 7/1986 | Francis |
| 4,870,278 A | 9/1989 | Leonardi-Cattolica et al. |
| 5,219,471 A | 6/1993 | Goual et al. |
| 5,340,477 A | 8/1994 | Simon |
| 6,110,352 A | 8/2000 | Su et al. |
| 7,705,058 B2 | 4/2010 | Coutinho et al. |

(Continued)

OTHER PUBLICATIONS

Otzisk, "Oil/Water Separation Technologies," Digital Refining—Process, Operation and Maintenance, retrieved from URL <https://www.digitalrefining.com/article/1000798,Oil_water_separation_technologies.html#.XQvzHGCWxiU>, Apr. 2013, 2 pages.

(Continued)

*Primary Examiner* — Richard C Gurtowski
(74) *Attorney, Agent, or Firm* — Fish & Richardson P.C.

(57) ABSTRACT

A method of dewatering a hydrocarbon storage tank carrying a first fluid layer that includes a first hydrogen concentration and a second fluid layer that includes a second hydrogen concentration includes receiving, from a sensor and by a processor communicatively coupled to the sensor, a value representing an amount of backscattered neutrons sensed by the sensor. The sensor is attached to a surface of a wall of the tank adjacent a fluid outlet of the storage tank. The sensor is configured to sense neutrons backscattered from the first fluid layer and an interface layer. The method includes comparing, by the processor, the value to a threshold, and actuating, by the processor, a valve fluidically coupled to the outlet of the storage tank to drain the first fluid layer from the storage tank while preventing the interface layer from leaving the storage tank.

20 Claims, 5 Drawing Sheets

(56) References Cited

U.S. PATENT DOCUMENTS

| | | | |
|---|---|---|---|
| 9,086,354 B2 | 7/2015 | Al-Sahan et al. | |
| 9,181,499 B2 | 11/2015 | Mason et al. | |
| 9,782,693 B2 | 10/2017 | Evanovich et al. | |
| 2005/0150842 A1* | 7/2005 | Puik | B01D 17/0208 210/744 |
| 2012/0017998 A1 | 1/2012 | Al-Sahan et al. | |
| 2014/0191135 A1 | 7/2014 | Partington et al. | |
| 2014/0202929 A1* | 7/2014 | Mason | B01D 21/305 208/298 |

OTHER PUBLICATIONS

Padron, "System and Method for Separation of Crude or Hydrocarbon Free and/or Disperse water," SPE Production, Exploration and Upgrading PDVSA SA, SPE-71468, 2001 SPE Annual Conference and Exhibition in New Orleans, Louisiana, Sep. 30-Oct. 3, 2001, 7 pages.

Pekdemir et al., "Emulsification of Crude Oil-Water Systems using Biosurfactants," Transactions of IChemE, Part B, Process Safety and Environmental Protection, vol. 83, B1, Jan. 2005, 10 pages.

slb.com [online], "EPF Crude Oil Treatment," retrieved from URL <https://www.slb.com/~/media/Files/testing/other/epf_crude_oil_treatment.pdf>, available on or before Feb. 25, 2019, 1 page.

Twomey, Inspection Techniques for Detecting Corrosion Under Insulation, NDT Net., vol. 3, No. 2, retrieved from URL <www.ndt.net/article/0298/twomey/twomey.htm>, Feb. 1998, 6 pages.

PCT International Search Report and Written Opinion in International Appln. No. PCT/US2020/045580, dated Nov. 30, 2020, 16 pages.

\* cited by examiner

DEWATERING A HYDROCARBON STORAGE TANK

TECHNICAL FIELD

This disclosure relates to storing fluids in storage tanks and dewatering storage tanks.

BACKGROUND

A hydrocarbon storage tank can store fluids of different properties. Such fluids can form different layers of fluid inside the tank. In some cases, a water layer can accumulate at the bottom of the storage tank. If the water is not removed from the tank, the quality of hydrocarbons stored in the tank might deviate from desired specifications. Methods for dewatering hydrocarbon storage tanks are sought.

SUMMARY

Implementations of the present disclosure include a method of dewatering a hydrocarbon storage tank carrying a first fluid layer that includes a first hydrogen concentration and a second fluid layer that includes a second hydrogen concentration different than the first hydrogen concentration. The first fluid layer is separated from the second fluid layer by an interface layer. The first fluid layer is disposed between the interface layer and a base of the storage tank. The first fluid layer is configured to receive additional fluid from the tank that increases a width of the first fluid layer to increase an elevation of the interface layer with respect to the base of the tank. The method includes receiving, from a sensor and by a processor communicatively coupled to the sensor, a value representing an amount of backscattered neutrons sensed by the sensor. The sensor is attached to an external surface of a wall of the tank and between 1 to 3 inches above a fluid outlet of the storage tank. The sensor is configured to sense neutrons backscattered from at least one of the first fluid layer and the interface layer, the neutrons emitted by a neutron emitting device attached to the wall of the tank. The method also includes comparing, by the processor, the value to a threshold. The method also includes actuating, by the processor and based on a result of comparing the value to the threshold, a valve fluidically coupled to the outlet of the storage tank to drain the first fluid layer from the storage tank while preventing the interface layer from leaving the storage tank.

In some implementations, receiving the value includes receiving, from the sensor, the value sensed at a location between 1 to 3 inches above the fluid outlet of the storage tank.

In some implementations, actuating the valve includes opening the valve or closing the valve to drain the first fluid layer while preventing the interface layer from leaving the storage tank.

In some implementations, the first fluid layer includes a higher density than the second fluid layer such that the first fluid layer includes more hydrogen per unit volume than the second fluid layer.

In some implementations, comparing the value to the threshold includes comparing the value to a first threshold and to a second threshold lower than the first threshold, the first threshold representing a first amount of backscattered neutrons and the second threshold representing a second amount of backscattered neutrons lower than the first amount. Actuating the valve includes opening the valve when the value meets the first threshold and closing the valve when the valve meets the second threshold.

In some implementations, the method further includes, prior to actuating the valve, determining, by the processor and based on the comparison of the value to the threshold, that the interface layer is at the same elevation as the sensor or above the elevation of the sensor.

In some implementations, the neutron emitting device and the sensor are disposed in a neutron backscatter permanently coupled to the external surface of the wall of the tank. Receiving the information includes receiving the information from the neutron backscatter with the neutron emitting device continuously emitting neutrons into the storage tank.

In some implementations, the valve includes a motor-operated valve and where actuating the valve includes actuating a motor of the motor-operated valve.

In some implementations, the valve is coupled to a first pipe fluidically coupled to a second pipe fluidically coupled to the outlet of the tank, the second pipe including a second valve. Actuating the valve includes actuating the valve as the second valve remains closed.

In some implementations, the first fluid layer includes a water layer, the second fluid layer includes a hydrocarbon layer, and the interface layer includes an emulsion layer.

Implementations of the present disclosure also include an automatic dewatering system. The system includes a hydrocarbon storage tank including a fluid outlet, the tank carrying a first fluid layer including a first hydrogen concentration and a second fluid layer including a second hydrogen concentration different than the first hydrogen concentration. The first fluid layer is separated from the second fluid layer by an interface layer, the first fluid layer disposed between the interface layer and a base of the storage tank. The first fluid layer is configured to receive additional fluid from the tank that increases a width of the first fluid layer to increase an elevation of the interface layer with respect to the base of the tank. The system also includes a neutron emitting device disposed adjacent the fluid outlet of the storage tank, the neutron emitting device configured to emit neutrons into the tank to be backscattered from at least one of the first fluid layer and the interface layer. The system also includes a sensor attached to an external surface of a wall of the tank, the sensor disposed adjacent the fluid outlet of the storage tank, the sensor configured to sense neutrons backscattered from at least one of the first fluid layer and the interface layer. The system also includes a valve fluidically coupled to the fluid outlet of the storage tank. The system also includes a processor communicatively coupled to the sensor and to the valve. The processor is configured to compare a value received from the sensor to a threshold, the value representing an amount of backscattered neutrons sensed by the sensor. The processor is configured to actuate, based on a result of comparing the value to the threshold, a valve fluidically coupled to the outlet of the storage tank to drain the first fluid layer from the storage tank while preventing the interface layer from leaving the storage tank.

In some implementations, the sensor is configured to sense the value at a location between 1 to 3 inches above the fluid outlet of the storage tank.

In some implementations, the processor is configured to open the valve or close the valve to drain the first fluid layer while preventing the interface layer from leaving the storage tank.

In some implementations, the first fluid layer includes a higher density than the second fluid layer such that the first fluid layer comprises more hydrogen per unit volume than the second fluid layer.

In some implementations, the processor is configured to compare the value to a first threshold and to a second threshold higher than the first threshold, the first threshold representing a first amount of backscattered neutrons and the second threshold representing a second amount of backscattered neutrons higher than the first amount, and where the processor is configured to open the valve when the value meets the first threshold and close the valve when the valve meets the second threshold.

In some implementations, the sensor includes a sensing surface including a height parallel to a height of the tank, the sensor configured to sense a change of an amount of backscattered neutrons as the interface layer moves in elevation across the height of the sensor.

In some implementations, the neutron emitting device and the sensor are disposed in a neutron backscatter permanently coupled to the external surface of the wall of the tank, and the neutron emitting device is configured to continuously emit neutrons into the storage tank.

In some implementations, the valve is coupled to a first pipe fluidically coupled to a second pipe fluidically coupled to the outlet of the tank, the second pipe including a second valve, and the processor is configured to actuate the valve as the second valve remains closed.

In some implementations, the first fluid layer includes a water layer, the second fluid layer includes a hydrocarbon layer, and the interface layer includes an emulsion layer.

Implementations of the present disclosure also include a system including at least one processing device communicatively coupled to a sensor attached to a wall of a storage tank, the storage tank including a fluid outlet, the tank carrying a first fluid layer including a first hydrogen concentration and a second fluid layer including a second hydrogen concentration different than the first hydrogen concentration. The first fluid layer is separated from the second fluid layer by an interface layer, the first fluid layer disposed between the interface layer and a base of the storage tank. The first fluid layer is configured to receive additional fluid from the tank that increases a width of the first fluid layer to increase an elevation of the interface layer with respect to the base of the tank. The system also includes a memory communicatively coupled to the at least one processing device, the memory storing instructions which, when executed, cause the at least one processing device to perform operations that include receiving, from the sensor, a value representing an amount of backscattered neutrons sensed by the sensor, the sensor attached to an external surface of the wall of the tank and between 1 to 3 inches above the fluid outlet of the storage tank, the sensor configured to sense neutrons backscattered from at least one of the first fluid layer and the interface layer, the neutrons emitted by a neutron emitting device attached to the wall of the tank. The operations also include comparing the value to a threshold, and actuating, based on a result of comparing the value to the threshold, a valve fluidically coupled to the outlet of the storage tank to drain the first fluid layer from the storage tank while preventing the interface layer from leaving the storage tank.

DETAILED DESCRIPTION OF THE DISCLOSURE

Figure 1:
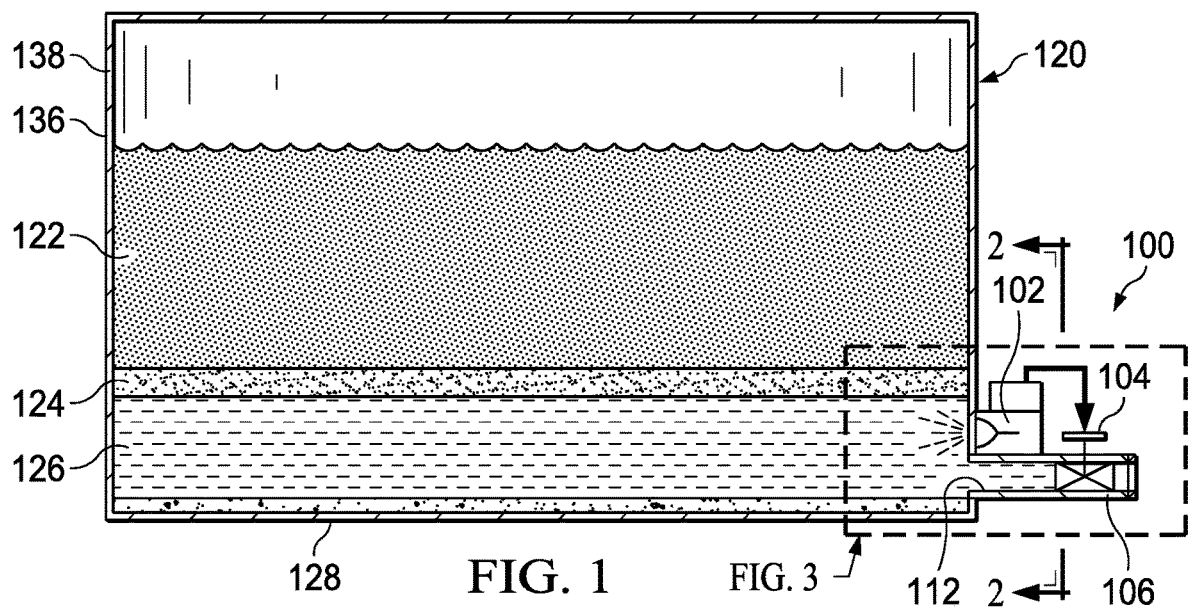
FIG. 1 is a side, schematic view of a hydrocarbon storage tank with an automatic dewatering system.
Figure 7:
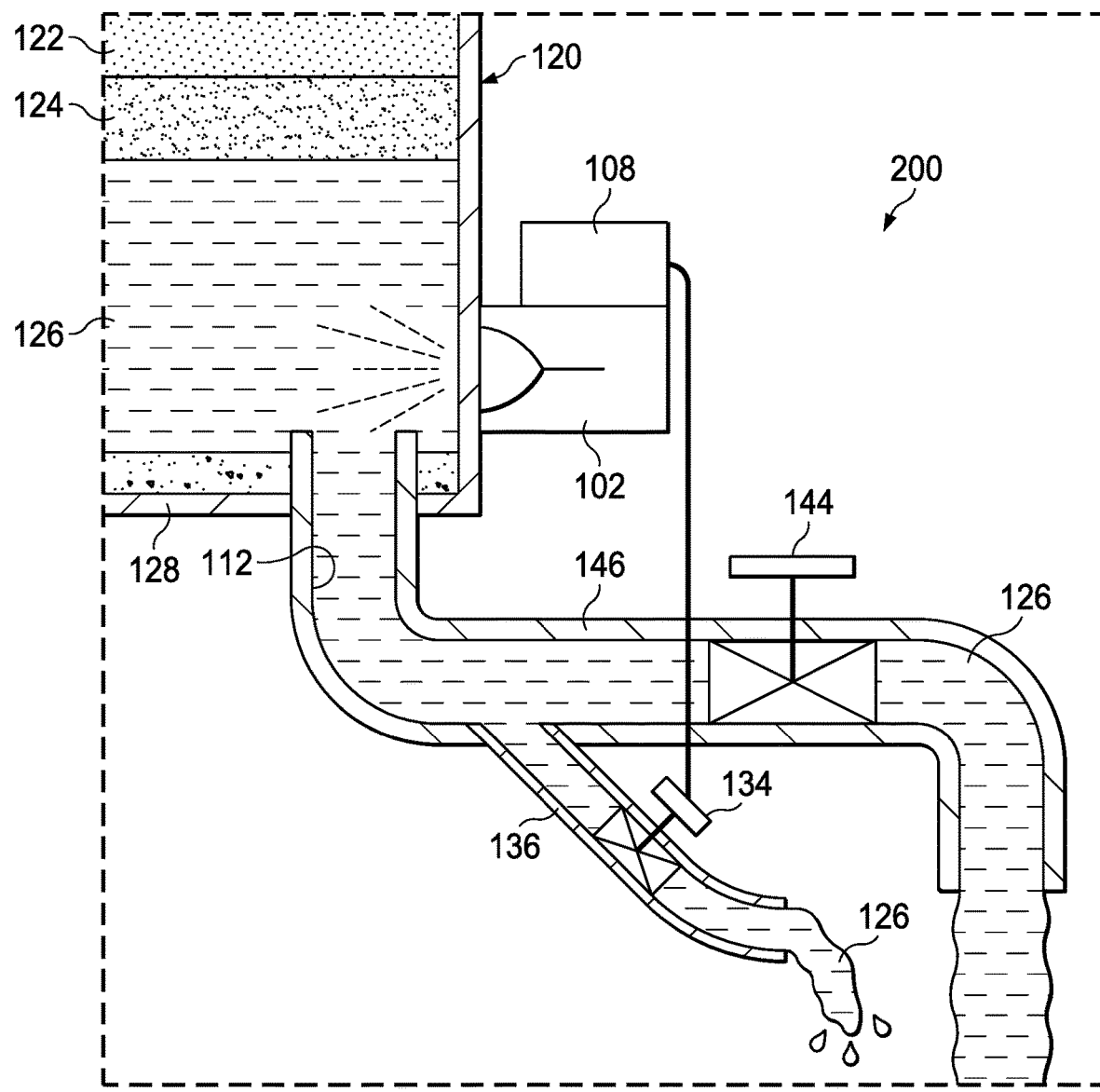
FIG. 7 is a schematic view of an automatic dewatering system according to an implementation of the present disclosure.

Referring to FIG. 1, the present disclosure relates to using a neutron backscatter 102 to automatically dewater a hydrocarbon storage tank 120. Hydrocarbon storage tanks carry hydrocarbons and other fluids. When the fluids inside the tank 120 settle, the fluid with the highest density is collected at the bottom of the tank 120 and the fluid with the lower density remains at the top of the tank 120. Thus, a first fluid layer 126 (for example, a water layer) settles at the bottom of the tank 120 and a second fluid layer 122 (for example, a hydrocarbon layer) remains at the top the tank 120. Between the hydrocarbon layer 122 and the water layer 126, a transition layer or interface layer 124 (for example, a hydrocarbon emulsion layer) is formed. The water layer 126 increases in width as water particles from the emulsion layer 124 settle down into the water layer 126. The elevation of the emulsion layer 124 changes as the water layer 126 increases in width. To maintain a high quality of the hydrocarbon per the required specifications, the percentage of water in the tank 120 must be minimized, hence the tank 120 is dewatered through a fluid outlet 112 (for example, a dewatering outlet at side of the tank or at the bottom of the tank, as shown in FIG. 7) connected to a pipe 106 to extract the water from the tank 120. To manually dewater a storage tank, a gauge may be used to estimate the level of water in the tank 120. Dewatering a tank 120 automatically saves time and resources, and allows the water to be extracted without exposing the emulsion layer 124 to the environment, preventing safety and environmental hazards. The neutron backscatter 102 detects the elevation of the emulsion layer 124 and sends such information to a processor (shown in FIG. 2) to actuate a valve 104 (for example, a motorized dewatering valve). The valve 104 is automatically opened and closed based on the readings of the neutron backscatter 102 to extract water from the tank 120 while preventing hydrocarbons from leaving the tank 120.

Implementations of the present disclosure may provide one or more of the following advantages. Efficient dewatering system resulting in better quality hydrocarbons. The system can save on cost of labor as the system is automatic. Additionally, water can be extracted from a hydrocarbon storage tank without exposing hydrocarbons to the environment.

FIG. 1 shows an automatic dewatering system 100 used in a flat-bottomed hydrocarbon storage tank 120. The automatic dewatering system 100 includes a neutron backscatter 102 attached to an external surface 136 of a wall 138 of the tank 120 to detect an elevation of fluids inside the tank 120. As described earlier, the hydrocarbon storage tank 120 carries the first fluid layer 126 and the second fluid layer 122 separated by the interface layer 124. The first fluid layer 126 can be a water layer and the second fluid layer 122 can be a hydrocarbon layer such as crude or refined oil. The water layer 126 reflects neutrons more efficiently or effectively than the hydrocarbon layer 122 or the emulsion layer 124. More specifically, because water has higher physical density than crude oil (for example, 1 g/cc versus 0.85 g/cc), there is more hydrogen present in the water layer 126 than in the hydrocarbon layer 122 or the emulsion layer 124. Because more hydrogen is present in a volume unit of water than in oil, the neutron beam of the neutron backscatter 102 illuminates or reaches more hydrogen in the water layer 126. Additionally, carbon atoms in hydrocarbons compete for the available neutrons and capture the neutrons at a rate around 18 time higher than the oxygen atoms in water (for example, neutron capture cross section of carbon is 3.5 millibarn versus neutron capture cross section of oxygen is 0.19 millibarn). The first fluid layer or the water layer 126 is disposed between the interface layer 124 and a base 128 (for example, a flat base such as a bottom plate) of the storage tank 120. The hydrocarbon emulsion layer 124 can be an oil-in-water layer or a water-in-oil layer, consisting of small globules of water surrounded by oil. With the help of gravity, small water droplets coalesce to form bigger droplets. The bigger water droplets settle down to increase the width of water layer 126. Such increase in width of the water layer is detected by the neutron backscatter 102 to automatically open and close the valve 104.

Figure 2:
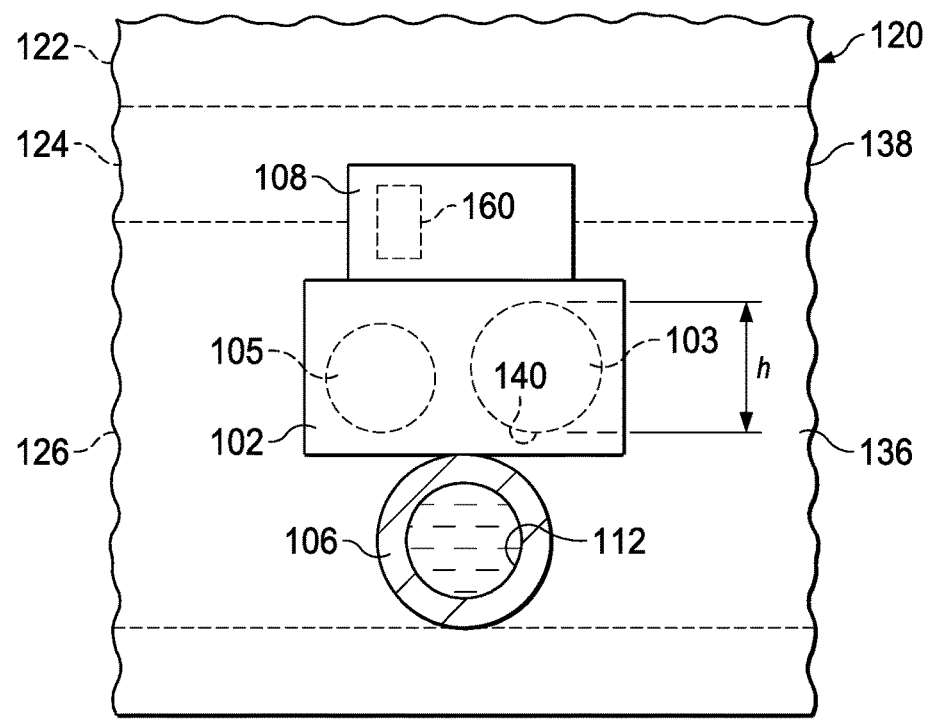
FIG. 2 is a front, cross sectional view of the automatic dewatering system, taken along line 2-2 in FIG. 1.

Referring to FIG. 2, the neutron backscatter 102 includes a neutron emitting device 105 and one or more neutron detection sensors 103. As explained earlier, neutrons are backscattered more effectively from water than from hydrocarbons. A neutron detector like proportional counters (for example, BF3 or $^3$He) or a semiconductor neutron counter can be used to recognize, based on the number of backscattered neutrons from the fluids in the tank, if the fluid at the level of the neutron backscatter 102 is the water layer 126 or another fluid (for example, the interface layer 124). For example, the neutrons emitting device 105 and the sensor 103 can be disposed inside a housing of the neutron backscatter 102. The neutron backscatter 102 can be permanently attached to the external surface of the wall of the tank 120. As shown in FIGS. 1 and 2, when the fluid outlet 112 is disposed on a side wall of the tank 120, the neutron backscatter 102 can be disposed adjacent the fluid outlet 112 of the storage tank 129 at a predetermined elevation with respect to the base of the tank. For example, the neutron emitting device 105 (or the neutron backscatter containing the neutron emitting device) is attached to the external surface 136 of the wall 138 of the tank 120 and is disposed directly above the fluid outlet 112. The neutron emitting device 105 continuously emits neutrons into the tank 120. As further described in detail later with respect to FIG. 7, when the fluid outlet is at the base 128 of the tank 120, the neutron backscatter 102 is disposed on the sidewall 138 of the tank 120, near the base 128 of the tank 120.

When the fluid outlet 112 is at the sidewall of the tank 120, the sensor 103 is disposed directly or substantially directly above the fluid outlet 112 of the storage tank 120. For example, a bottom end 140 of the sensor 103 can be vertically separated from the fluid outlet 112 by a distance of 2 inches. The sensor 103 (or the neutron backscatter 102 containing the sensor) is attached to the external surface 136 of the wall 138 of the tank. The sensor 103 has a sensing surface that has a height 'h' parallel to a height of the tank 120. The sensor 103 senses a change of the amount of backscattered neutrons as the interface layer 124 moves in elevation across the height of the sensor 103. A processor 108 or processing device disposed above or near the neutron backscatter 102 can be communicatively coupled (for example, electrically coupled) to the sensor 103. The processor can include a memory 160 communicatively coupled to the processor. The memory can store instructions that cause the processor to perform the functions described in the present disclosure. As further described in detail later with respect to FIGS. 3-6, the processor uses the information received from the sensor 103 to control a valve configured to dewater the tank 120.

The neutron emitting device 105 can be a radioactive source of high energy neutrons that emits neutrons into the tank 120 through the wall 138 of the tank 120. The hydrogen atoms of the fluids inside the tank 120 moderate these to low energy or thermal neutrons which can be readily measured with the sensor 103. For example, as neutrons emitted by the neutron emitting device 105 react with the hydrogen atoms of the fluids, neutrons are backscattered or reflected back to the sensor 103. Thus, the higher the hydrogen concentration of a liquid, the higher the amount of neutrons that are backscattered to the sensor 103. The neutron emitting device 105 emits neutrons into the tank 120 to be backscattered from at least one of the first fluid layer 126 and the interface layer 124. As the elevation of the interface layer 124 increases or decreases, the amount of backscattered neutrons sensed by the sensor 103 changes.

Figure 3:
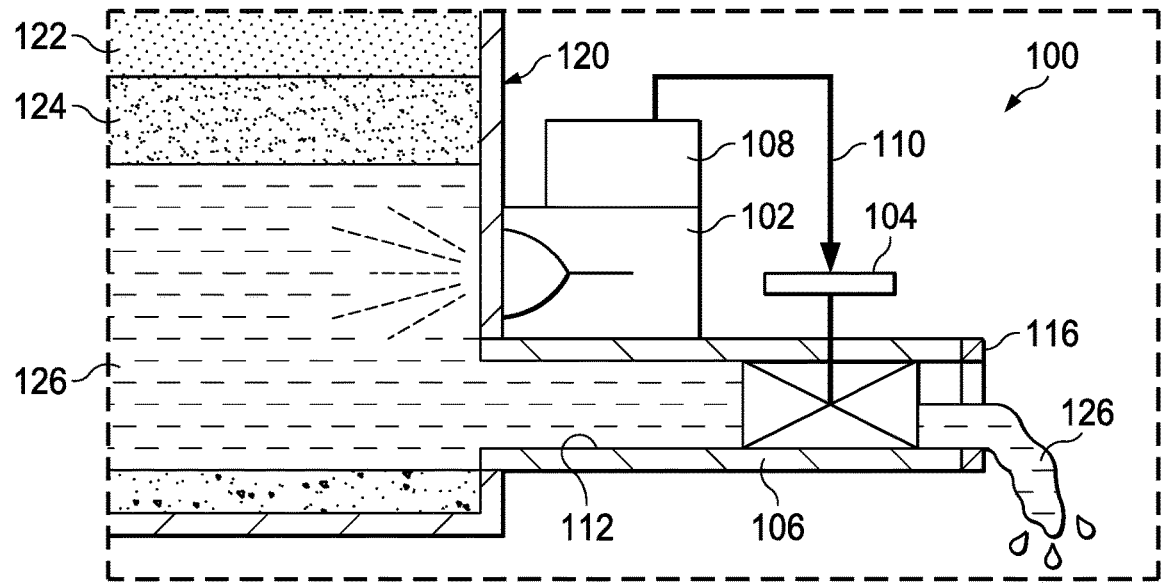
FIGS. 3-6 are side, schematic views of a process of dewatering a storage tank using an automatic dewatering system.

FIGS. 3-6 illustrate a process of dewatering the storage tank 120 using the automatic dewatering system 100. Referring to FIG. 3, the automatic dewatering system 100 includes the neutron backscatter 102, and the processor 108 communicatively coupled to the sensor (see FIG. 2) of the neutron backscatter 102 or coupled directly to the neutron backscatter 10. The system 100 also includes a motor-operated valve 104 communicatively coupled (for example, through a cable 110 or wirelessly) to the processor 108. The valve 104 is fluidically coupled, through the pipe 106, to the outlet 112 of the storage tank 120. The valve 104 is actuated by the processor 108 to drain the first fluid layer 126 from the storage tank 120 while preventing fluid from the interface layer 124 from leaving the storage tank 120. For example, the processor 108 receives a value from the neutron backscatter 102 and compares the value to one or more thresholds. The value represents an amount of backscattered neutrons sensed by the sensor at a location directly above or near the fluid outlet 112 of the tank 120. The processor 108 actuates, based on a result of comparing the value to the one or more thresholds, the valve 104 to close or open the valve 104. More specifically, a first amount of neutrons are backscattered from the water layer 126 and a second amount of neutrons, lower than the first amount, are backscattered from the emulsion layer 124. The processor 108 can compare the value to a first threshold and a second threshold. The first threshold represents a first amount of backscattered neutrons and the second threshold representing a second amount of backscattered neutrons lower than the first amount. For example, the first threshold is a value that represents most or all neutrons being backscattered from water (for example, that the water layer is at the elevation of the sensor), and the second threshold is a value that represents most or all neutrons being backscattered from the emulsion layer (for example, that the emulsion layer is at the elevation of the sensor). When the value (for example, the amount of backscattered neutrons) meets the first threshold, the valve 104 is opened and when the value meets the second threshold, the valve 104 is closed.

Figure 4:
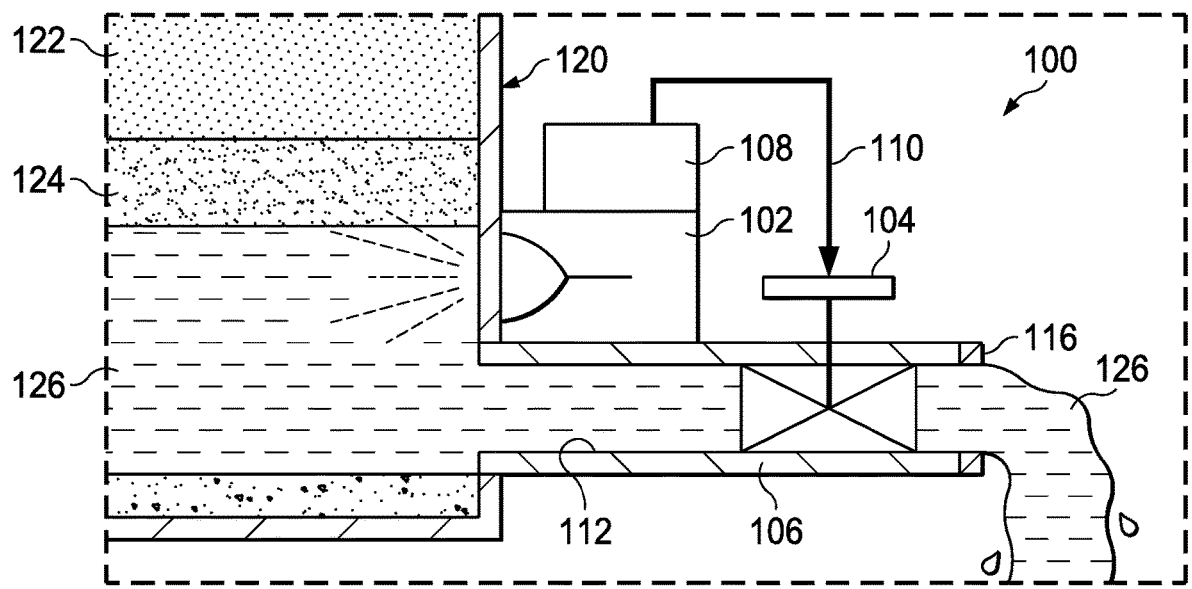
Figure 5:
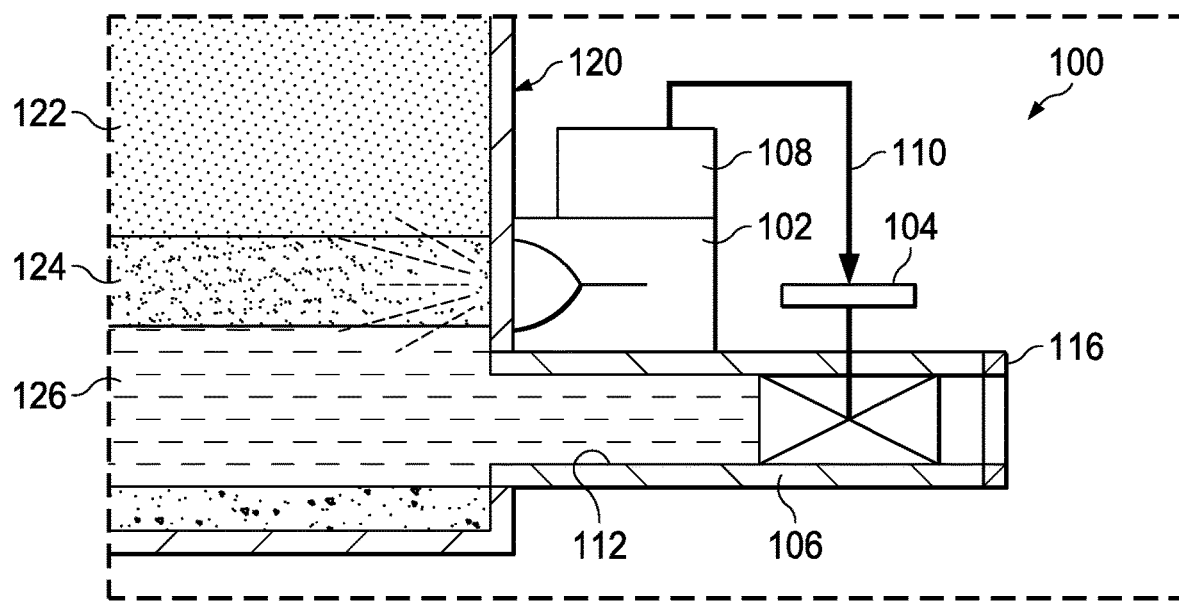
Figure 6:
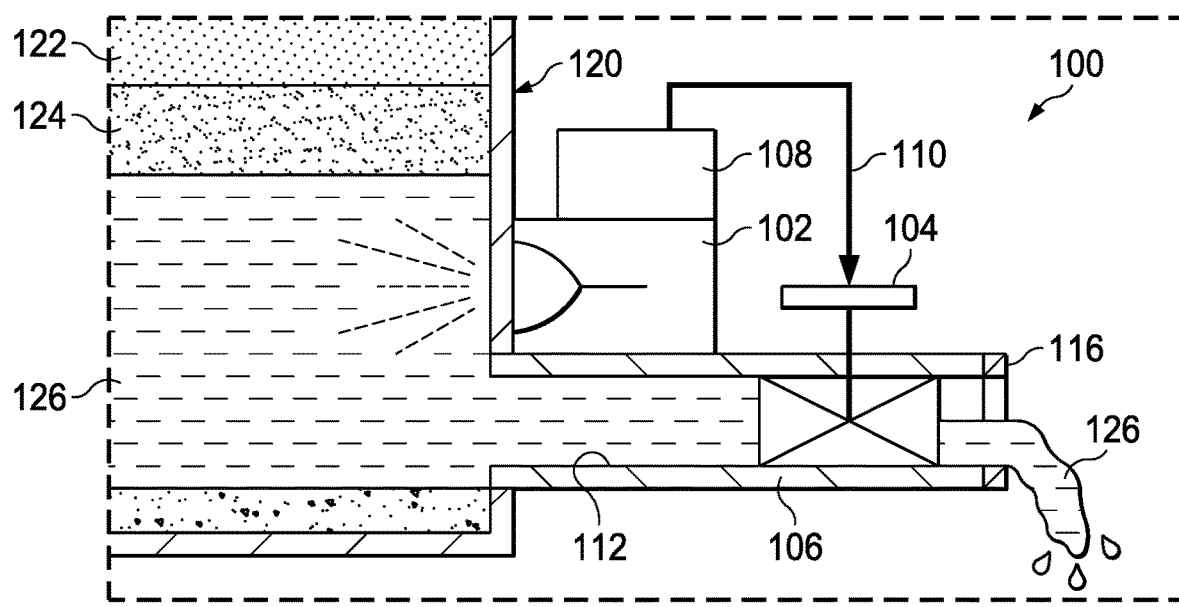

As shown in FIG. 3, the emulsion layer 124 is at a higher elevation than the sensor or the neutron backscatter 102. The water layer 126 has increased in width to at an elevation that covers all or most of a height of the neutron backscatter 102. At such elevation, the sensor of the neutron backscatter 102 senses an amount of backscattered neutrons that meet the first threshold. Such amount is the value sent from the sensor to the processor 108. When the processor 108 determines that the value meets the first threshold, the processor 108 opens the valve 104 to dewater the tank 120. Referring to FIG. 4, the neutron backscatter 102 continues to emit neutrons into the tank 120 as the water leaves the tank and the elevation of the emulsion layer 124 decreases. As the elevation of the emulsion layer 124 decreases to the elevation of the neutron backscatter 102, the amounts of neutrons detected by the sensor of the neutron backscatter decreases. The processor 108 receives the value sensed by the sensor and compares the value to the thresholds. The second threshold is a value low enough to allow the elevation of the emulsion layer to decrease such that most or all of the emulsion layer falls to the elevation of the sensor. As shown in FIG. 5, when the processor 108 determines that the value meets the second threshold (for example, when the value of backscattered neutrons is low enough to indicate that the emulsion layer is about to reach the fluid outlet), the processor 108 closes the valve 104. As shown in FIG. 6, the valve 104 is kept closed as the water level increases again to move the emulsion layer 124 to an elevation higher than the sensor of the neutron backscatter 102. When such elevation is higher, the valve is opened again as described earlier with respect to FIG. 3. Thus, when the amount of backscattered neutrons is decreasing (e.g., the width of the water layer 126 is increasing to move the emulsion layer 124 above the elevation of the sensor), the valve remains closed until the first (high) threshold is met and the valve is opened. When the amount of backscattered neutrons decreases (e.g., the width of the water layer 126 is decreasing to move the emulsion layer 124 to the same elevation of the sensor), the valve remains open until the second (low) threshold is met and the valve is closed.

FIG. 7 illustrates an example of an automatic dewatering system 200 according to a different implementation. The dewatering system 200 is implemented in a storage tank 120 that has its fluid outlet 112 at the base 128 of the tank 120. The neutron backscatter 102 is disposed between 1 to 3 inches (for example, 2 inches) above the fluid outlet 112 of the storage tank (or above the level of the base 128). Additionally, FIG. 7 shows an example in which the automatic dewatering system 200 is retrofitted into an existing dewatering system. In some examples, the automatic dewatering system 200 is implemented to provide an automatic option of dewatering the storage tank 120 and a manual option of dewatering the storage tank 120. A motor-operated valve 134 is coupled to a first pipe 136 fluidically coupled to a second pipe 146 fluidically coupled to the outlet of the tank 112. The second pipe 146 has a second valve 144 that is configured to be opened and closed manually. The second pipe 146 can be, for example, an existing pipe that is part of a manual dewatering system. Similar to the automatic dewatering system of FIG. 1, the automatic dewatering system 200 has a neutron backscatter 102 disposed above the fluid outlet 112 and a processor 108 that actuates the motor-operated valve 134 based on readings of the neutron backscatter 102. The processor 108 actuates the valve 134 as the second valve 144 remains closed. For example, the second valve 144 can be used to dewater the tank 120 when the automatic dewatering system 200 is being maintained or replaced, and remain closed as the automatic dewatering system 200 operates to dewater the tank 120.

Figure 8:
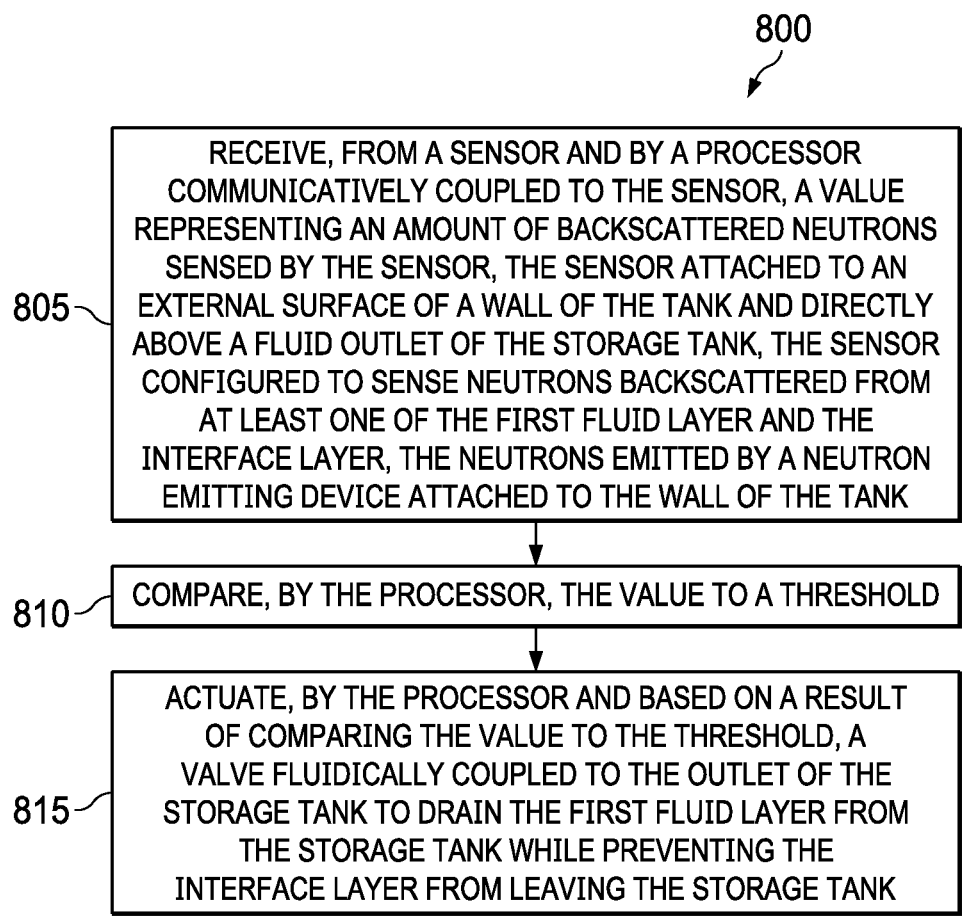
FIG. 8 is a flow chart of an example process of dewatering a storage tank.

FIG. 8 shows a flowchart of an example method 800 of dewatering a hydrocarbon storage tank. The method includes receiving, from a sensor and by a processor communicatively coupled to the sensor, a value representing an amount of backscattered neutrons sensed by the sensor, the sensor attached to an external surface of a wall of the tank and directly above a fluid outlet of the storage tank, the sensor configured to sense neutrons backscattered from at least one of the first fluid layer and the interface layer, the neutrons emitted by a neutron emitting device attached to the wall of the tank (805). The method also includes comparing, by the processor, the value to a threshold (810). The method also includes actuating, by the processor and based on a result of comparing the value to the threshold, a valve fluidically coupled to the outlet of the storage tank to drain the first fluid layer from the storage tank while preventing the interface layer from leaving the storage tank (815).

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Ranges may be expressed in the present disclosure as from about one particular value, or to about another particular value or a combination of them. When such a range is expressed, it is to be understood that another implementation is from the one particular value or to the other particular value, along with all combinations within said range or a combination of them.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described in the present disclosure and provided in the appended figures are set forth without any loss of generality, and without imposing limitations on the claimed implementations. For example, the implementations are described with reference to a tee pipe fitting. However, the disclosure can be implemented with any appropriate pipe fitting that connects two or more pipes flowing fluids of different pressures.

That which is claimed is:

1. A method of dewatering a hydrocarbon storage tank carrying a first fluid layer comprising a first hydrogen concentration and a second fluid layer comprising a second hydrogen concentration different than the first hydrogen concentration, the first fluid layer separated from the second fluid layer by an interface layer, the first fluid layer disposed between the interface layer and a base of the storage tank, the first fluid layer configured to receive additional fluid from the tank that increases a width of the first fluid layer to increase an elevation of the interface layer with respect to the base of the tank, the method comprising:

receiving, from a sensor and by a processor communicatively coupled to the sensor, a value representing an amount of backscattered neutrons sensed by the sensor, the sensor attached to an external surface of a wall of the tank and adjacent a fluid outlet of the storage tank, the sensor configured to sense neutrons backscattered from at least one of the first fluid layer and the interface layer, the neutrons emitted by a neutron emitting device attached to the wall of the tank;

comparing, by the processor, the value to a threshold; and actuating, by the processor and based on a result of comparing the value to the threshold, a valve fluidically coupled to the outlet of the storage tank to drain the first fluid layer from the storage tank while preventing the interface layer from leaving the storage tank.

2. The method of claim 1, wherein receiving the value comprises receiving, from the sensor, the value sensed at a location between 1 to 3 inches above the fluid outlet of the storage tank.

3. The method of claim 1, wherein actuating the valve comprises opening the valve or closing the valve to drain the first fluid layer while preventing the interface layer from leaving the storage tank.

4. The method of claim 1, wherein the first fluid layer comprises a higher density than the second fluid layer such that the first fluid layer comprises more hydrogen per unit volume than the second fluid layer.

5. The method of claim 1, wherein comparing the value to the threshold comprises comparing the value to a first threshold and to a second threshold lower than the first threshold, the first threshold representing a first amount of backscattered neutrons and the second threshold representing a second amount of backscattered neutrons lower than the first amount, and wherein actuating the valve comprises opening the valve when the value meets the first threshold and closing the valve when the valve meets the second threshold.

6. The method of claim 1, further comprising, prior to actuating the valve, determining, by the processor and based on the comparison of the value to the threshold, that the interface layer is at the same elevation as the sensor or above the elevation of the sensor.

7. The method of claim 1, wherein the neutron emitting device and the sensor are disposed in a neutron backscatter permanently coupled to the external surface of the wall of the tank, and wherein receiving the value comprises receiving the value from the neutron backscatter with the neutron emitting device continuously emitting neutrons into the storage tank.

8. The method of claim 1, wherein the valve comprises a motor-operated valve and wherein actuating the valve comprises actuating a motor of the motor-operated valve.

9. The method of claim 1, wherein the valve is coupled to a first pipe fluidically coupled to a second pipe fluidically coupled to the outlet of the tank, the second pipe comprising a second valve, and wherein actuating the valve comprises actuating the valve as the second valve remains closed.

10. The method of claim 1, wherein the first fluid layer comprises a water layer, the second fluid layer comprises a hydrocarbon layer, and the interface layer comprises an emulsion layer.

11. An automatic dewatering system, comprising:
a hydrocarbon storage tank comprising a fluid outlet, the tank carrying a first fluid layer comprising a first hydrogen concentration and a second fluid layer comprising a second hydrogen concentration different than the first hydrogen concentration, the first fluid layer separated from the second fluid layer by an interface layer, the first fluid layer disposed between the interface layer and a base of the storage tank, the first fluid layer configured to receive additional fluid from the tank that increases a width of the first fluid layer to increase an elevation of the interface layer with respect to the base of the tank;
a neutron emitting device disposed above the fluid outlet of the storage tank adjacent the fluid outlet, the neutron emitting device configured to emit neutrons into the tank to be backscattered from at least one of the first fluid layer and the interface layer;
a sensor attached to an external surface of a wall of the tank, the sensor disposed above the fluid outlet of the storage tank adjacent the fluid outlet, the sensor configured to sense neutrons backscattered from at least one of the first fluid layer and the interface layer;
a valve fluidically coupled to the fluid outlet of the storage tank; and
a processor communicatively coupled to the sensor and to the valve, the processor configured to compare a value received from the sensor to a threshold, the value representing an amount of backscattered neutrons sensed by the sensor, the processor configured to actuate, based on a result of comparing the value to the threshold, a valve fluidically coupled to the outlet of the storage tank to drain the first fluid layer from the storage tank while preventing the interface layer from leaving the storage tank.

12. The system of claim 11, wherein the sensor is configured to sense the value at a location between 1 to 3 inches above the fluid outlet of the storage tank.

13. The system of claim 11, wherein the processor is configured to open the valve or close the valve to drain the first fluid layer while preventing the interface layer from leaving the storage tank.

14. The system of claim 11, wherein the first fluid layer comprises a higher density than the second fluid layer such that the first fluid layer comprises more hydrogen per unit volume than the second fluid layer.

15. The system of claim 11, wherein the processor is configured to compare the value to a first threshold and to a second threshold higher than the first threshold, the first threshold representing a first amount of backscattered neutrons and the second threshold representing a second amount of backscattered neutrons higher than the first amount, and wherein the processor is configured to open the valve when the value meets the first threshold and close the valve when the valve meets the second threshold.

16. The system of claim 11, wherein the sensor comprises a sensing surface comprising a height parallel to a height of the tank, the sensor configured to sense a change of an amount of backscattered neutrons as the interface layer moves in elevation across the height of the sensor.

17. The system of claim 11, wherein the neutron emitting device and the sensor are disposed in a neutron backscatter permanently coupled to the external surface of the wall of the tank, and wherein the neutron emitting device is configured to continuously emit neutrons into the storage tank.

18. The system of claim 11, wherein the valve is coupled to a first pipe fluidically coupled to a second pipe fluidically coupled to the outlet of the tank, the second pipe comprising a second valve, and wherein the processor is configured to actuate the valve as the second valve remains closed.

19. The system of claim 11, wherein the first fluid layer comprises a water layer, the second fluid layer comprises a hydrocarbon layer, and the interface layer comprises an emulsion layer.

20. A system comprising:
- at least one processing device communicatively coupled to a sensor attached to a wall of a storage tank, the storage tank comprising a fluid outlet, the tank carrying a first fluid layer comprising a first hydrogen concentration and a second fluid layer comprising a second hydrogen concentration different than the first hydrogen concentration, the first fluid layer separated from the second fluid layer by an interface layer, the first fluid layer disposed between the interface layer and a base of the storage tank, the first fluid layer configured to receive additional fluid from the tank that increases a width of the first fluid layer to increase an elevation of the interface layer with respect to the base of the tank; and
- a memory communicatively coupled to the at least one processing device, the memory storing instructions which, when executed, cause the at least one processing device to perform operations comprising:
  - receiving, from the sensor, a value representing an amount of backscattered neutrons sensed by the sensor, the sensor attached to an external surface of the wall of the tank and adjacent the fluid outlet of the storage tank, the sensor configured to sense neutrons backscattered from at least one of the first fluid layer and the interface layer, the neutrons emitted by a neutron emitting device attached to the wall of the tank;
  - comparing the value to a threshold; and
  - actuating, based on a result of comparing the value to the threshold, a valve fluidically coupled to the outlet of the storage tank to drain the first fluid layer from the storage tank while preventing the interface layer from leaving the storage tank.

* * * * *